(12) United States Patent
Brandt et al.

(10) Patent No.: US 7,015,986 B2
(45) Date of Patent: Mar. 21, 2006

(54) DISPLAY UNIT

(75) Inventors: Peter Brandt, Babenhausen (DE);
Gerd Cezanne, Schwalbach (DE);
Norbert May, Babenhausen (DE);
Achim Reisinger, Hofheim (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/213,510

(22) Filed: Dec. 17, 1998

(65) Prior Publication Data

US 2001/0001565 A1 May 24, 2001

(30) Foreign Application Priority Data

Dec. 23, 1997 (DE) .............................. 197 58 383

(51) Int. Cl.
*G02F 1/1333* (2006.01)
*G02F 1/1335* (2006.01)

(52) U.S. Cl. ......................................... 349/58; 349/64

(58) Field of Classification Search ................... 349/1, 349/11, 68, 16, 58–60, 62, 64; 362/27, 29, 362/30, 31, 23, 28, 489, 559, 561, 487
See application file for complete search history.

(56) References Cited

U.S. PATENT DOCUMENTS

| 4,005,928 A | * | 2/1977 | Kmetz et al. ............... 350/160 |
| 4,247,930 A | * | 1/1981 | Martin ......................... 349/58 |
| 4,323,951 A | * | 4/1982 | Pasco .......................... 362/27 |
| 4,621,306 A | * | 11/1986 | Sell .............................. 362/29 |
| 4,687,072 A | * | 8/1987 | Komuro ...................... 180/219 |
| 4,975,807 A | * | 12/1990 | Ohashi ........................ 362/23 |
| 5,003,433 A | * | 3/1991 | Fournier ...................... 362/29 |
| 5,049,866 A | * | 9/1991 | Miyajima ..................... 349/58 |
| 5,099,396 A | * | 3/1992 | Barz et al. .................. 361/424 |
| 5,313,335 A | | 5/1994 | Gray et al. ................. 359/839 |
| 5,578,985 A | * | 11/1996 | Cremers et al. ........... 340/461 |
| 5,629,784 A | * | 5/1997 | Abileah et al. ............. 349/112 |
| 5,659,376 A | * | 8/1997 | Uehara et al. ................ 349/58 |
| 5,675,397 A | * | 10/1997 | Fukushima ................... 349/58 |
| 5,741,058 A | * | 4/1998 | Suzuki et al. ................ 362/27 |
| 5,742,366 A | * | 4/1998 | Imoto .......................... 349/58 |
| 5,815,072 A | * | 9/1998 | Yamanaka et al. .......... 340/461 |
| 5,915,822 A | * | 6/1999 | Ogura et al. ................. 362/26 |

FOREIGN PATENT DOCUMENTS

| DE | 3025784 | | 2/1982 |
| DE | 4433150 | | 3/1996 |
| EP | 0638832 | | 2/1995 |
| JP | 9-68441 | * | 11/1997 |

OTHER PUBLICATIONS

Patent Abstracts of Japan, 08094991 A, Apr. 12, 1996, Casio Comput Co. Ltd.
Patent Abstracts of Japan, 09068684 A, Mar. 11, 1997 Sega Enterp Ltd.
Patent Abstracts of Japan 09054322 A, Feb. 25, 1997, Casio Comput Co. Ltd.

(Continued)

*Primary Examiner*—Dung T. Nguyen
(74) *Attorney, Agent, or Firm*—Martin A. Farber

(57) ABSTRACT

In a display unit for a motor vehicle, a display designed as an LCD is arranged in the same plane as a dial plate of a pointer-type instrument. For this purpose, the dial plate has a cutout into which the display is bonded. This makes the display and the dial plate particularly easy to read.

17 Claims, 3 Drawing Sheets

OTHER PUBLICATIONS

Patent Abstracts of Japan, 09160010 A, Jun. 20, 1997, Kansei Corp.
Patent Abstracts of Japan, 09218407 A, Aug. 19, 1997, Canon Inc.
Patent Abstracts of Japan, 07114000 A, May 2, 1995, Sharp Corp.
Patent Abstracts of Japan, 5-203899, P-1648, Nov. 22, 1993, vol. 17/No. 631, Sanyo Electric Co. Ltd.
Patent Abstracts of Japan, 5-203900 (A), P-1648 Nov. 22, 1993, vol. 17/No. 631, Sanyo Electric Co. Ltd.
Patent Abstracts of Japan, 5-264948 (A), P-1678 Jan. 19, 1994, vol. 18/No. 36, Idemitsu Kosan Co. Ltd.

* cited by examiner

DISPLAY UNIT

FIELD AND BACKGROUND OF THE INVENTION

The invention relates to a display unit, particularly for a vehicle, having a dial plate and having a display arranged in a region of the dial plate.

Such display units are frequently used in modern motor vehicles and are therefore known. The dial plate of the pointer-type instrument is a plate having a cutout with the display arranged behind it. In this instance, the display is designed as an LCD and is inserted in a cutout in an optical waveguide arranged behind the dial plate. As a result of this design, the display is illuminated uniformly.

A disadvantage of the known display unit is the presence of a gap between the transparent region and the display. As a result of this, reflections may occur between the display and the transparent region, and these reflections greatly reduce the legibility of the display. In addition, in the known display unit, extraneous light influences can cause shadows on the display, which likewise impairs the legibility of the display. Furthermore, the presentation plane of the display is different than the dial plate plane, which has a scale and/or display symbols; viewed from the direction of an observer, the display is arranged behind the dial plate plane. This has an additional negative effect on the legibility of the display unit.

The invention is based on the problem of designing a display unit of the type mentioned above in such a way that it ensures that the display and the dial plate are easy to read.

SUMMARY OF THE INVENTION

The invention achieves this object by virtue of the fact that the front of the display, which faces an observer, is arranged in the same plane as the front of the dial plate, which faces the observer.

As a result of this design, no reflections can occur between the dial plate and the display, which may be a liquid crystal screen, for example. In addition, the formation of shadows caused by extraneous light influences is reliably prevented. The display unit according to the invention therefore allows the display and the dial plate to be read particularly easily. By virtue of the invention, the display unit has a particularly small physical depth and is also of particularly simple design. The dial plate may be a dial plate of an individual pointer-type instrument or else a dial plate which is common to a number of pointer-type instruments.

The display unit according to the invention comprises a particularly small number of components if a front panel of the display is arranged in a cutout in the dial plate.

The formation of shadows as a result of extraneous light on the display can be reliably prevented, in accordance with another advantageous development of the invention, if a pole (polarization) filter of the front panel of a display designed as a liquid crystal screen is arranged in the same plane as a film applied to the front of the dial plate.

According to another advantageous development of the invention, the display has a uniform surface if a film which covers the dial plate and the display is designed as a scale and as a pole filter.

According to another advantageous development of the invention, the display can easily be fastened in the dial plate if the display is bonded or clipped in the cutout in the dial plate.

According to another advantageous development of the invention, the display is particularly reliably held in the dial plate if a rear panel of the display is bonded to the back of the dial plate.

The display unit according to the invention is particularly robust if the front panel of the display is fastened on a support element arranged at the back of the dial plate.

To improve the legibility of the display unit according to the invention further, it helps if the front panel of the display is connected to an optical waveguide of the dial plate so as to form a single component.

In addition, this design means that the display unit according to the invention comprises a particularly small number of components.

The display unit according to the invention is illuminated particularly uniformly if the dial plate and the display each have a light source to illuminate them.

The display unit according to the invention has a particularly low weight and is nevertheless highly robust if the dial plate is made of plastic.

Making electrical contact with the display in the display unit and robustly holding the display are particularly simple if the display is a liquid crystal screen and if the front pole filter of the liquid crystal screen is connected to a dial plate film so as to form a single component, the front pole filter being spaced apart from other components of the liquid crystal screen. This additionally ensures that the display unit is very easy to read, and moving constituent parts of the liquid crystal screen away from the dial plate region also affords particularly good possibilities for making electrical contact with—e.g. directly on a printed circuit board of the display unit—and holding the screen—e.g. by holding it in a solid support. Particularly as a result of stimuli which frequently crop up in motor vehicles as a result of vibration, it is essential for high operational reliability and a long service life that the liquid crystal screen is held securely. According to this advantageous development of the invention, the front pole filter is also a constituent part of the display; it is merely spaced apart from other components of the display. Without the front pole filter, operability of the liquid crystal screen is not guaranteed.

It is particularly advantageous if a lightproof channel is arranged between the front pole filter and the other components of the liquid crystal screen. This prevents stray light which finds its way at the sides into the region between the front pole filter and other components of the display from impairing, distorting or disabling a display.

A particularly robust and durable arrangement of the display in the display unit is achieved if the other components of the liquid crystal screen are held by a frame. In this instance, the frame preferably has a lightproof channel, which reduces the number of components in the display unit and thus increases ease of assembly. According to another advantageous development of the invention, the frame is particularly easy to fasten in the display unit if it is bonded or clipped into a support for the dial plate.

BRIEF DESCRIPTION OF THE DRAWINGS

The invention permits numerous embodiments. To clarify its basic principle further, a number of these are illustrated in the drawing and described below. In the drawing.

DETAILED DESCRIPTION OF THE PREFERRED EMBODIMENTS

Figure 1:
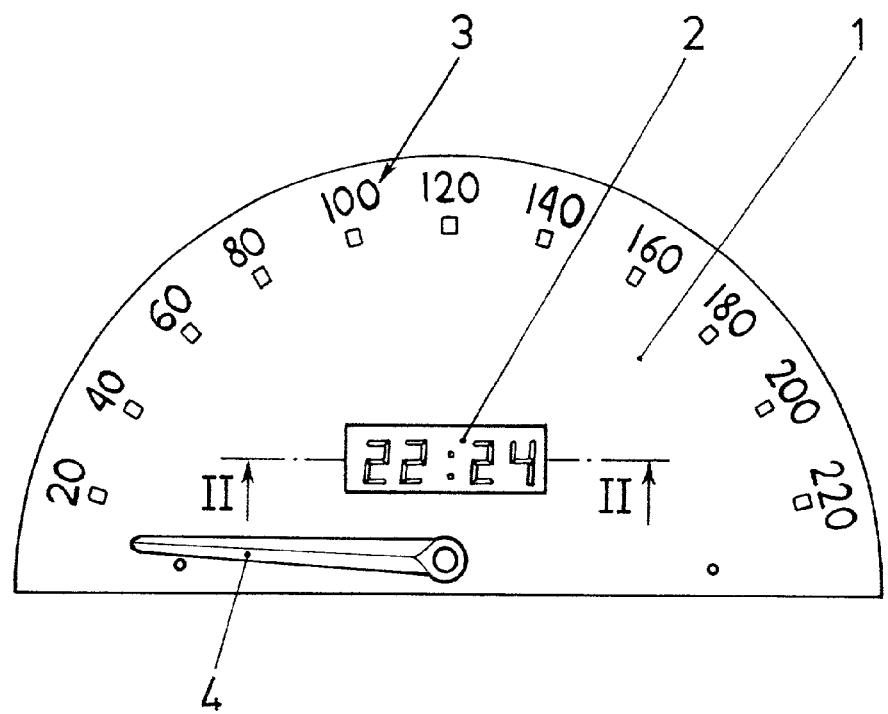
FIG. 1 shows a display unit according to the invention.

FIG. 1 shows a display unit for a motor vehicle having a dial plate 1 of a pointer-type instrument and having a display 2. The pointer-type instrument has a scale 3 which is arranged on the dial plate 1 and over which a pointer 4 is held such that it can rotate. The pointer-type instrument is designed as a tachometer in this case. The display 2 is arranged in a central region of the dial plate 1 and is used to display a time, for example.

Figure 2:
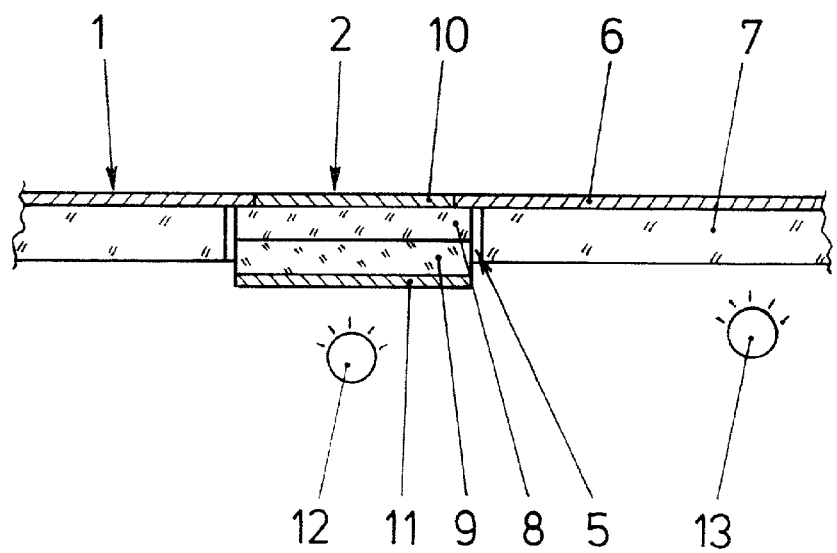
FIG. 2 shows a sectional illustration through a dial plate of the display unit in FIG. 1 along the line II—II.

FIG. 2 uses a sectional illustration along the line II—II in FIG. 1 to show that the display 2 is bonded in a cutout 5 in the dial plate 1; alternatively, the display 2 could be clipped into the dial plate 1. The dial plate 1 has an optical waveguide 7 which is covered with a film 6. The film 6 is used to show the scale 3, and to this end may be of translucent design, for example. Alternatively, the film 6 may also be opaque if the scale 3 is produced by cutouts in the film 6. The display 2 is designed as a liquid crystal screen and has a front and a rear panel 8, 9. The liquid crystal screen is shown here only schematically, electrical connections, liquid crystal matter situated between the panels 8, 9, and electrodes for driving the liquid crystal matter, for example, being omitted from the drawing. The panels 8, 9 are each provided with a pole filter 10, 11. The pole filter 10 of the front panel 8 is arranged in the same plane as the film 6 of the dial plate 1. As a result of this, the display unit according to the invention has a smooth surface and is particularly easy to read. By virtue of the invention, no shadows can be formed if extraneous light impinges at the sides on the dial plate 1. In addition, light sources 12, 13 are respectively arranged behind the display 2 and the optical waveguide 7 of the dial plate 1. As a result of this, the dial plate 1 and the display 2 can be backlit independently of one another.

Figure 3:
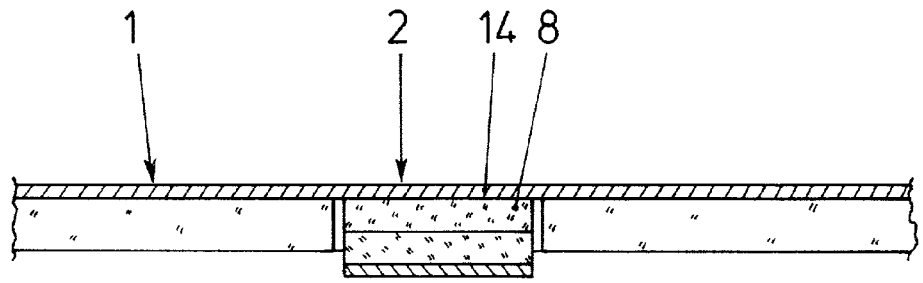
FIGS. 3–6 show sectional illustrations of further embodiments of the display unit according to the invention.

FIG. 3 shows a further embodiment of the display unit according to the invention, in which the dial plate 1 and the display 2 are covered by a common film 14. The film 14 is designed as a pole filter of the front panel 8 of the display 2, and at the same time as a scale 3 of the dial plate 1, as shown in FIG. 1.

Figure 4:
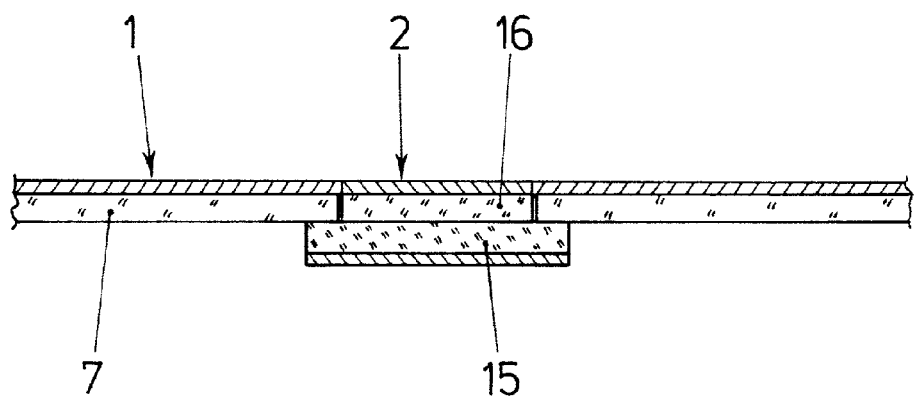

FIG. 4 shows a further embodiment of the display unit according to the invention, in which a rear panel 15 of the display 2 has larger dimensions than a front panel 16 and is bonded to the back of the optical waveguide 7 of the dial plate 1. The optical waveguide 7 of the dial plate 1 has a thickness corresponding to that of the front panel 16 of the display 2. This means that the display 2 and the dial plate 1 have a common smooth surface for an observer.

Figure 5:
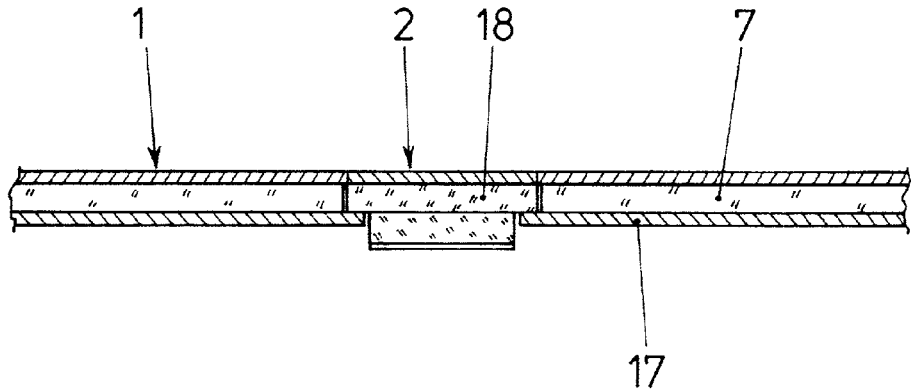

FIG. 5 shows an embodiment of the display unit according to the invention in which a support element 17 is arranged behind the dial plate 1. A front panel 18 of the display 2 is fastened on the support element 17. As in the embodiment in FIG. 4, the front panel 18 of the display 2 has a thickness corresponding to that of the optical waveguide 7 of the dial plate 1.

If it is undesirable or unnecessary to backlight the dial plate, e.g. because frontlighting is chosen, then the optical waveguide 7 in the abovementioned exemplary embodiments may be replaced by a support component which does not conduct light, e.g. a plate or a frame.

Figure 6:
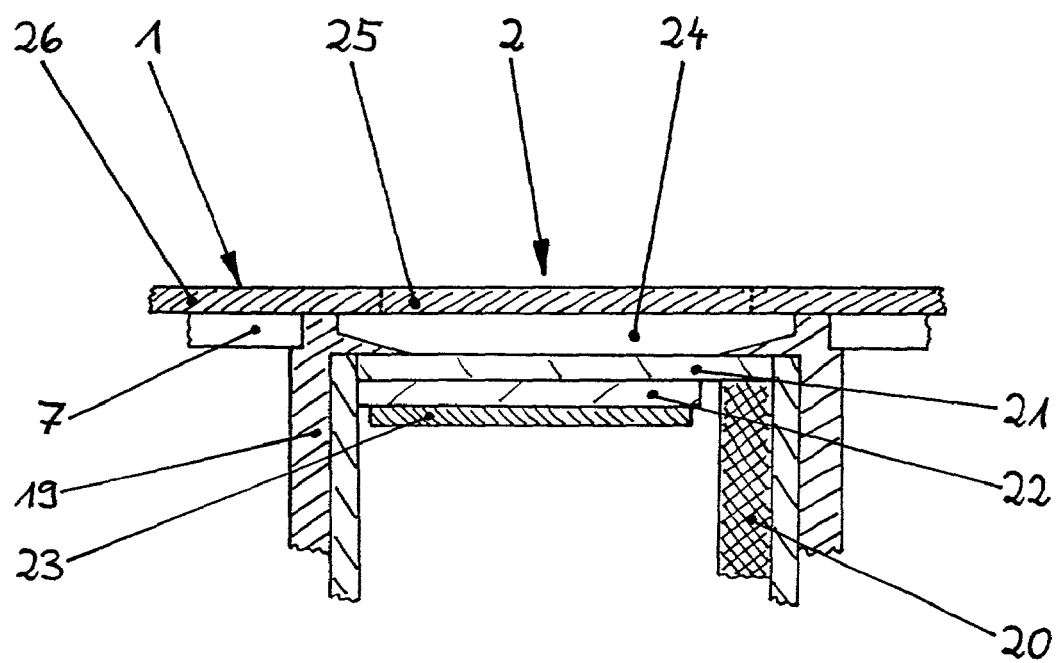

FIG. 6 shows an embodiment in which a dial plate 1 is connected to a front pole filter 25 of a liquid crystal screen 2 so as to form a single component. In this instance, for example, a dial plate film 26 may be designed overall as a pole filter printed with display symbols and/or a scale. Clipped or bonded into a cutout in a support or optical waveguide 7 of the dial plate 1 is a frame 19, which holds a front panel 21, a back panel 22, a back pole filter 23 and a conductive rubber element 20 used for making electrical contact. On the dial plate side, the frame 19 forms a lightproof channel 24, so that operation of the liquid crystal screen 2 is not impaired by light which is incident from the side; this is because the front pole filter 25 is a constituent part of the display designed as a liquid crystal screen, but is spaced apart from the other constituent parts by the channel 24 of the frame 19. Without the front pole filter 25, the liquid crystal screen would not be able to operate. The order of magnitude of the depth of the channel 24, i.e. the order of magnitude of the spacing between the front pole filter 25 and the front panel 21, is a few millimeters.

The embodiment shown in FIG. 6 enables the display 2 to be held in a very robust and vibration-resistant manner, whilst nevertheless ensuring that the dial plate 1 is easy to read. By coloring the dial plate 1 dark gray or black, it is possible to achieve a so-called black-panel effect, which improves discernibility and prevents reflections.

We claim:

1. A display unit, suitable for a vehicle, comprising:
    a dial assembly and a display located in a region of the dial assembly, the display comprising a liquid crystal screen with a front polarizing filter located on a front surface of the liquid crystal screen facing an observer, the dial assembly comprising a dial plate having an optical waveguide covered with a film with dial markings located on a front surface of the dial plate facing the observer, wherein
    the front surface of the liquid crystal screen is arranged in the same plane as a front surface of the optical waveguide, the front surface of the liquid crystal screen contacting the front surface of the optical waveguide to form therewith a continuous planar surface; and
    the polarizing filter of the display is arranged in the same plane as the film of the dial assembly.

2. The display unit as claimed in claim 1, wherein the liquid crystal screen of the display comprises a front panel arranged in a cutout in the dial plate.

3. The display unit as claimed in claim 2, wherein the display is attached by bonding or clipping in the cutout in the dial plate.

4. The display unit as claimed in claim 2, wherein the optical waveguide abuts an edge of the display; and
    wherein the front panel of the display is connected to the optical waveguide so as to form a single component.

5. The display unit as claimed in claim 2, further comprising a support element located at the back of the dial plate; and
    wherein the front panel of the display is fastened on the support element.

6. The display unit as claimed in claim 1, wherein the film covers the dial plate and the display, comprises a scale in the region of the display, and serves as the polarizing filter.

7. The display unit as claimed in claim 1, wherein the livid crystal screen comprises a rear panel which is bonded to the back of the dial plate.

8. The display unit as claimed in claim 1, wherein the dial plate comprises plastic.

9. The display unit as claimed in claim 1, further comprising a first light source serving as a backlight to illuminate the dial plate, and a second light source serving as a backlight to illuminate the display.

10. A display unit, suitable for a vehicle, comprising:
    a dial assembly and a display located in a region of the dial assembly, the display comprising a liquid crystal screen with a front polarizing filter located in front of a front surface of the liquid crystal screen facing an observer, the dial assembly comprising a dial plate and a film with dial markings located on a front surface of the dial plate facing the observer, wherein the polarizing filter of the display is arranged in the same plane as the film of the dial assembly; and wherein, the front polarizing filter of the liquid crystal screen connects to the dial plate film so as to form a single component with a continuous planar surface, and there is an empty space behind the front polarizing filter.

11. The display unit as claimed in claim 10, wherein said empty space serves as a lightproof channel.

12. The display unit as claimed in claim 11, further comprising a frame for holding components of the liquid crystal screen.

13. The display unit as claimed in claim 12, wherein the frame includes the lightproof channel.

14. The display unit as claimed in claim 12, wherein the frame is bonded or clipped into a support of the dial plate.

15. The display unit as claimed in claim 10, further comprising a first light source serving as a backlight to illuminate the dial plate, and a second light source serving as a backlight to illuminate the display.

16. A display unit, suitable for a vehicle, comprising:

a dial plate, a frame and a display, the display being located in a region of the dial plate and having a front surface, the display comprising a liquid crystal screen with a front polarizing filter, a front surface of the polarizing filter being the front surface of the display, the dial plate having a film thereon and constituting with the film a dial assembly, wherein the front surface of the display, which faces an observer, is arranged in the same plane as a front surface of the dial assembly, which faces the observer, the front surface of the display contacting the front surface of the dial assembly to form therewith a continuous planar surface; and wherein, in the contacting of the front surface of the display with the front surface of the dial assembly, the front polarizing filter of the liquid crystal screen is spaced apart from the liquid crystal screen to form therewith and with the frame an empty space behind the front polarizing filter, said empty space serving with the frame as a light proof channel for light incident from a side of the display to facilitate a reading of the display unit.

17. The display unit as claimed in claim 16, further comprising a first light source serving as a backlight to illuminate the dial plate, and a second light source serving as a backlight to illuminate the display.

* * * * *